June 12, 1928.
J. WALDHEIM
1,673,272
TYPEWRITING MACHINE
Filed June 5, 1923
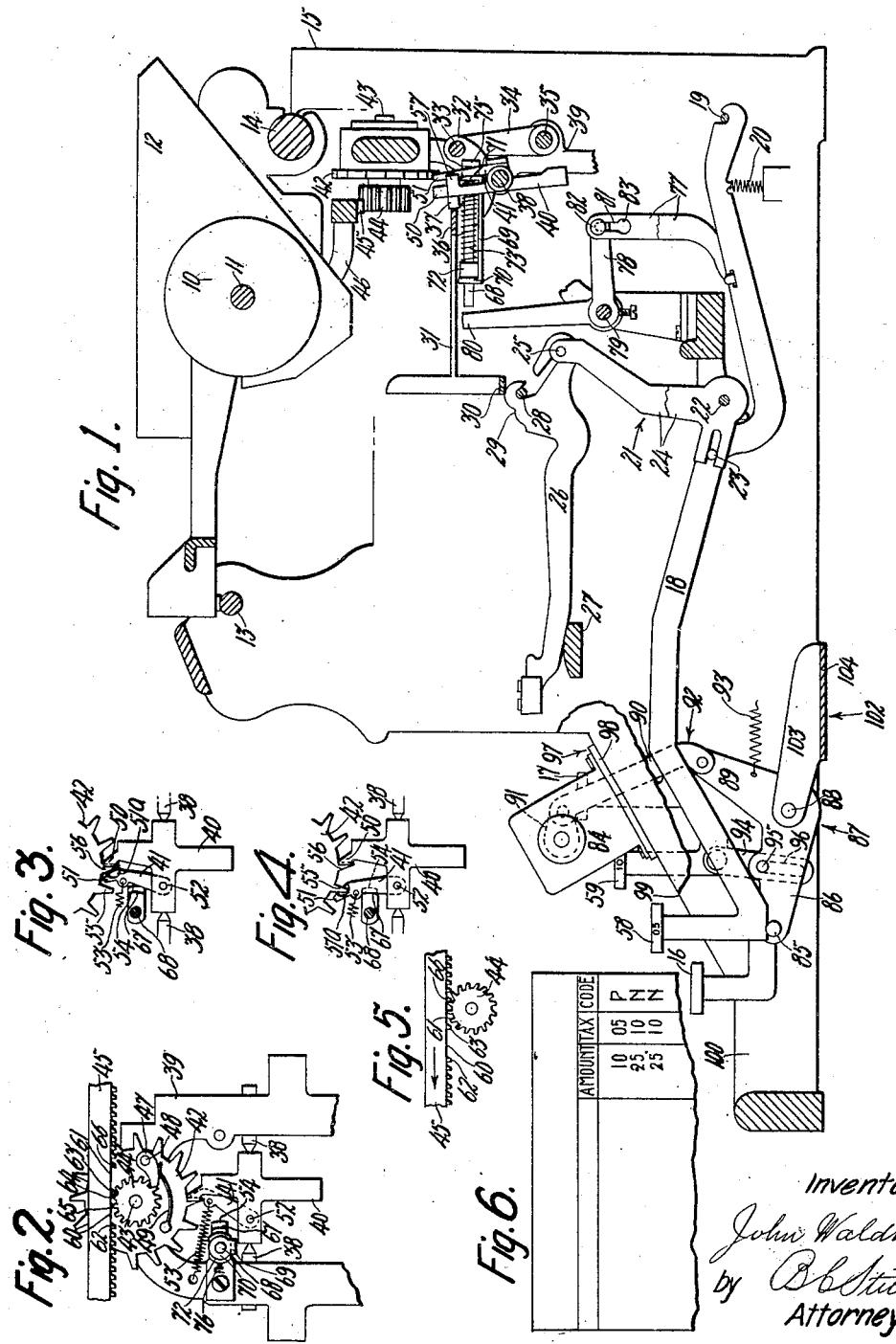
Inventor:
John Waldheim
by D.L. Stickney
Attorney Patented June 12, 1928.

1,673,272

UNITED STATES PATENT OFFICE.

JOHN WALDHEIM, OF ELIZABETH, NEW JERSEY, ASSIGNOR TO UNDERWOOD ELLIOTT FISHER COMPANY, OF NEW YORK, N. Y., A CORPORATION OF DELAWARE.

TYPEWRITING MACHINE.

Application filed June 5, 1923. Serial No. 643,482.

The invention relates to mechanism, in a typewriting machine, for facilitating the writing of statements, such, for instance, as telephone bills, in which it is required to type, in separate columns, the date, the number of messages, the place called, the company's charge, the government tax, and a code symbol.

Ordinarily a typewriter-carriage is propelled in letter-feed direction by a spring-drum, and is controlled by suitable escapement mechanism comprising a rack on the carriage, having the teeth thereof pitched at letter-space distance therealong, a pinion in mesh with the rack, and a dog acting, on each operation of a universal bar moved by the several type-key-levers, to determine the throw of the pinion.

In the instance given, it is desirable to jump the carriage to the tax column, automatically and without attention on the part of the operator, upon completion of the entry in the preceding column of the bill, by omitting from the rack the teeth which would otherwise connect the carriage with the escapement mechanism to control the letter-feed movement of the carriage between these columns. In such case, the carriage, at the selected column position thereof, will cause the rack to present a gap, or toothless portion thereof, to the pinion; and the carriage, being then unrestrained by the pinion, will jump leftward until arrested by engagement of the pinion with the tooth on the rack next to the right thereof. This arresting tooth may define the position of the carriage for typing in the tax column. It is also desirable to cause the carriage to be jumped automatically from the tax column to a succeeding code column as an incident to completion of writing in the tax column.

The amount of the tax is ordinarily either five or ten cents; and so, two special character keys have heretofore been provided, one for writing "05", and the other for writing "10" in the tax column; both digits of each of these amounts being written by a single key-stroke. Where such a single key-stroke is all that is required in the tax column, the tooth which has arrested the carriage in that column may be followed immediately by another gap in the rack, to provide for the jump to the code column. Due, however, to the relatively small normal letter-feed of the carriage, the teeth of the pinion are ordinarily so close to one another that two of them at all times project into the path of the rack-teeth; and a single letter-space movement of the pinion will therefore not suffice to clear the pinion, of the rack-tooth which has arrested the carriage in the tax column.

The object of the present invention is the provision of means whereby, upon operation of a non-ordinary key, such, for instance, as either of the special character tax keys referred to, the dog, or equivalent device, for determining the rotary throw of the pinion, may be allowed an abnormal movement, that is to say, a multiple, instead of a single, letter-space movement; thereby permitting of sufficient rotary movement of the pinion to clear, from the aforesaid arresting tooth on the rack, the two or more pinion-teeth which may lie in the path of such arresting tooth.

The movement or throw of the dog has heretofore been determined by a fixed stop set to prescribe for the dog a single letter-feed movement thereof. In accordance with the present invention, in its preferred form, two stops, one to be substituted for the other, are provided for the dog; and these stops are mounted on a slide or carrier actuable by a key, such, for instance, as either of the non-ordinary tax keys referred to. Assuming then, that the stop for single letter-feed movement of the dog is normally held in effective position by action of a spring on the slide, such non-ordinary key when operated will act upon the slide, against the action of the spring, to move the single letter-feed stop to ineffective position, and to move the multiple letter-feed stop to effective position; thereby effecting the carriage jump as an incident to the operation of the key. When the key is released, the spring will act on the slide to return the stops to normal position.

The key or keys, referred to, may be type-keys or may be keys forming part of a tabulating mechanism, and are termed "non-ordinary" in contradistinction to the ordinary single-space type-keys. In the embodiment of the invention hereinafter described, these keys are both typing and tabulating keys; and a further feature of the invention is the provision of means whereby, as an incident to the operation of a tabulating key, a column jump of the carriage may be automatically effected.

Other features and advantages will hereinafter appear.

In the accompanying drawings,

Figure 1 is a view, in cross-sectional side elevation, of a machine embodying the present invention.

Figure 2 is a view, in front elevation, of the escapement mechanism in its idle position.

Figure 3 is a view, in front elevation, of the escapement mechanism with the loose dog under the control of the stop which determines single letter-feed movement of the carriage.

Figure 4 is a view, in front elevation, of the escapement mechanism with the loose dog under the control of the stop which determines multiple letter-feed movement of the carriage for column jumping.

Figure 5 is a view of the mutilated portion of the carriage-rack and of the pinion which controls the same; the rack being in position for typing in the code column.

Figure 6 is a view of the upper portion of a telephone charge slip, showing the columnal work for which the machine is adapted.

A platen 10, by means of its axle 11, is revolubly mounted in the side plates 12 of a carriage, which has movement in letter-feed and return directions on rails 13 and 14 on a main frame 15. The carriage is urged in letter-feed direction by the usual spring-drum and strap (not shown); and may be returned by hand or by motor.

The keyboard of the machine has the usual letter-keys 16 and numeral-keys 17. These ordinary type-keys are supported on levers 18, fulcrumed at 19 at the rear of the machine. Springs 20 return the key-levers and keys to normal positions. Bell-cranks 21, pivoted at 22, have each a pin-and-slot engagement 23 with one of the keys; and one arm 24 of each of the bell-cranks pivotally connects at 25 to a type-bar 26. On depression of a key, the corresponding type-bar 26 swings from its position of rest on a type-bar cushion 27, upward and rearward around its pivot 28 in the usual segment-plate, to strike against the front of the platen. At this movement of the type-bar, a shoulder 29 thereon strikes a universal bar 30, and throws the same rearward to actuate the escapement mechanism which controls the letter-feed of the carriage. The universal bar is supported on arms 31, having extensions 32 at the rear thereof, by means of which the arms and the universal bar are pivotally secured at 33, and supported by, arms 34 which swing on an axis 35 when the universal bar is actuated.

When the universal bar receives a rearward thrust, a cross-piece 36, connecting the arms 31, engages a pin 37 on a dog-rocker set to swing forward and rearward on pins 38 in the frame-member 39. This dog-rocker comprises a so-called fixed dog 40 and a so-called loose dog 41, each having a tooth for engagement with an escapement-wheel 42, fast to a shaft 43 journaled in the frame-member 39. Loose on the shaft 43 is a pinion 44 in mesh with a rack 45, supported by arms 46 secured to the carriage. A pawl 47, pivoted at 48 to the escapement-wheel 42, is so set and held against the pinion 44 by a spring 49, as to cause the escapement-wheel to rotate with the pinion 44 when the spring-drum (not shown) pulls the carriage and rack 45 in letter-feed direction; but permits the pinion 44 to be rotated independently of the escapement-wheel 42 when the carriage and rack 45 thereon are moved in a reverse letter-feed direction.

In the normal or idle position of the dog-rocker, the tooth 50 on the fixed dog 40, as shown in Figure 1, is in a forward position out of engagement with the teeth of the escapement-wheel 42, and the tooth 51 on the loose dog 41 is in engagement with the escapement-wheel to hold the carriage against the action of the spring-drum. When, however, as hereinbefore described, the universal bar is thrust rearward to move the dog-rocker, the tooth 50 on the fixed dog engages the escapement-wheel and the tooth 51 on the loose dog is thrown rearward out of engagement with the escapement-wheel. The loose dog is pivoted at 52 to the fixed dog in such manner that, when the loose dog is cleared of the escapement-wheel, a spring 53 throws the loose dog leftward until arrested by a stop 54. Ordinarily, the stop 54 is so positioned as to arrest the loose dog in position for engagement by that tooth 55 of the escapement-wheel which immediately follows the tooth 56 of the escapement-wheel then held by the fixed dog 40 (see Figure 3). When the type-key is released, and the universal bar and dog-rocker thus permitted to be returned by springs (not shown) to normal position, the tooth 51 of the loose dog enters into the escapement-wheel 42 in the path of the tooth 55 thereof, and the tooth 50 of the fixed dog is cleared of the escapement-wheel. Thereupon, the escapement-wheel (by reason of its connection to the pinion 44 and to the rack 45), under the impulse of the spring-drum, is turned to cause the tooth 55 of the wheel to engage and throw the loose dog rightward against the action of the spring 53 until the loose dog strikes a tooth or abutment 57 on the rear of the fixed dog. The loose dog and, consequently, the escapement-wheel 42, pinion 44 and carriage are thus arrested after a single letter-space movement of the latter.

Thus far the mechanism described is that found in the Underwood standard typewriting machine. The mechanisms for facilitating the typing of telephone bills of the character hereinbefore mentioned will now be described.

In this instance the non-ordinary 5 cent and 10 cent tax keys 58 and 59, respectively, are mounted on levers similar to the levers 18, which carry the ordinary letter and numeral keys, and, which like the latter, are pivoted at 19. The amount taxed is written in the usual way by the numeral keys in the amount column. After writing the figure in the last or units position in the amount column, it is desired automatically to jump the carriage to position for writing the tax in the tax column; and, after writing the tax in the tax column, it is desired automatically to jump the carriage to position for writing the letter in the code column. For effecting these two jumps, in this instance, the carriage-rack 45 (see Figures 2 and 5) is mutilated; that is to say, has certain teeth removed to provide two blanks or gaps 60 and 61 in the rack. These blanks are so positioned that, at the time of writing the last digit in the amount column, the carriage is held by engagement of the tooth 62 on the rack with the pinion. As the key for writing this figure is released, the tooth 62 is cleared of the pinion, and the carriage, by reason of the pull of the spring drum, is thrown leftward until the tooth 63 on the rack engages one of the teeth on the pinion; thus defining the position of the carriage for operation of the selected tax key to type in the tax column.

As hereinbefore stated, the two tax keys each carry both of the numeral-types which constitute the respective amounts "05" and "10"; so that, in the tax column, a single tax key receives a single depression. Such operation of the tax key would release the tooth 63 from the pinion to permit the second jump of the carriage, except for the fact, as will be noted upon reference to Figure 2, that the two uppermost teeth 64 and 65 of the pinion are both in the path of the tooth 63 on the rack, and consequently a double letter-feed of the pinion is necessary to clear the tooth 63 therefrom for the second jump. This second jump when effected brings the tooth 66 of the rack into engagement with the teeth on the pinion to determine the position of the carriage for writing a letter in the code column. It is, however, with the means for clearing the tooth 63 of the rack from the pinion that the present invention is chiefly concerned.

The manner in which the stop 54, as shown in Figure 3, determines a single letter-feed movement of the pinion 44, has been hereinbefore described. If the stop 54 were set farther to the left, so as to provide for a greater movement of the loose dog 41, a double letter-feed movement of the pinion 44 might be had; and provision thereby made for clearing the tooth 63 of both pinion-teeth 64 and 65 by simple rearward thrust of the universal bar on depression of one of the tax keys. Since, however, the double letter-feed movement is only desired when one of the tax keys is operated, other arrangements are made. Instead of a single stop 54 for the loose dog, an additional stop 67 is provided, to be substituted for the stop 54 when a tax key is operated; the stop 67 being set farther to the left than is the stop 54, so as to permit the greater throw of the loose dog required for a double letter-feed of the pinion. In Figure 4, the stop 67 is shown as arresting the loose dog with the tooth 51 thereof to the left of the escapement-wheel tooth 55, instead of to the right of that tooth, as shown in Figure 3; thus providing for the greater throw of the loose dog to the stop 57 on the fixed dog. The upper part of the loose dog may be cut away as indicated at $51^a$ to permit the tooth 51 thereof to enter behind the escapement tooth 55.

The stops 54 and 67 in this instance are shown as steps on a block secured to a thrust pin or bar 68 mounted to be shifted forward and rearward in a bracket 69 secured to the main frame, and may be of the general type shown in the patent to J. C. Doane, No. 1,322,548, dated November 25, 1919. As shown the bracket 69 has upturned ears 70 and 71 at its ends, in which the pin 68 has its bearings. A collar 72, secured to the pin 68, serves as the abutment for one end of a spring 73 coiled around the pin; the other end of the spring bearing against the ear 71 at the rear of the bracket 69. The collar 72, by engagement with the ear 70, determines the normal or forward position of the pin, in which position the stop 54 is in the plane of the loose dog 41. Rearward movement of the pin 68 against the action of the spring 73 results in displacement of the stop 54 from the plane of the loose dog, and in positioning of the stop 67 in such plane; so that, when the pin 68 is thrown rearward, the mechanism is set for double letter-feed of the pinion. An ear 75 on the rear of the bracket 69, in the path of the rear end of the pin 68, may serve to determine the throw of the pin 68 to position the stop 67 in the plane of the loose dog. The collar 72 is secured by a set-screw 76 to the pin 68 for adjustment therealong to determine the proper setting of the stops and proper adjustment of the spring 73. The collar 72 has a flat in engagement with the horizontal portion of the bracket 69, to prevent rotary displacement of the pin 68 and stops 54 and 67 thereon. For effecting a double letter-feed movement of the pinion to clear the tooth 63 therefrom, it only remains to provide means for throwing the pin 68 rearward when a tax key is operated.

For this purpose, the lever 18 of each tax key is in this instance connected by a link 77 with one of two arms 78 fast to a rock-shaft 79. Also fast to the rock-shaft 79 is an arm 80 in the plane of the pin 68, and in such angular position that, when either tax key is depressed, it will, through its lever 18, link 77 and arm 78, rock the shaft 79 to throw the arm 80 against the forward end of the pin 68, thereby thrusting the latter rearward to substitute the stop 67 for the stop 54 in the plane of the loose dog 41. The links 77 are slotted at 81, so that, when the rock-shaft 79 and consequently both arms 78 are swung by actuation of either tax key, the arm 78 for the tax key not operated may have movement without effecting movement of the tax-key-lever which is not intended to be operated. As shown, pins 82, adapted to be passed into enlargements 83 at the lower ends of the slots 81, and thence up into position in the slots, conveniently serve as connections between the links 77 and the arms 78. A coil-spring (not shown) on the shaft 79 serves normally to hold the parts in Figure 1 position, and return the same to Figure 1 position when the tax key is released.

It is desirable to be able to refer at any time to the total amount of the tax items in a definite period, such, for example, as a day or a longer period. For this purpose, a register 84 of the general type as the Veeder cyclometer may be provided. Inasmuch as the register is to record the addition of 5 and 10 only, the wheel of lowest denomination is provided with "0" and "5" arranged alternately, and the carry-over mechanism is arranged to actuate the dial or wheel of next higher denomination each time a "5" on the dial of lowest denomination is shifted from the sight-opening of the next to the lowest dial-wheel and replaced by the "0" immediately succeeding. It should be understood that the carry-over from the second wheel from the right is effected only when that wheel or dial has made a complete revolution, and the same is true of other wheels of higher denomination.

Upon depression of the special "05" key 58 to print the number "05" on a work-sheet, the forward end of the corresponding key-lever 18 which overlies a pin 85 at the forward end of a substantially horizontal arm 86 of a bell-crank lever 87 will rock the lever 87 about its pivot 88 and swing a second arm 89 of the bell-crank lever from its normal, Figure 1, position, extending upwardly and rearwardly from the pivot 88, to a substantially vertical position, thereby thrusting upwardly a link 90 which is pivoted at its lower end to the arm 89 and at its upper end to an oscillatory arm 91 which serves to actuate the register 84. It will be seen that the arm 89 and the link 90 form a toggle, indicated in general by 92, so that the actuation of the register may be effected by a comparatively light pressure of the key 58. Upon the return movement of the key 58 the bell-crank 87 and the parts connected therewith will be restored to their normal positions by means of a spring 93 connected at its forward end to the bell-crank 87 and at its rear end to any convenient fixed part of the machine.

For actuating the bell-crank 87 when the special "10" key 59 is depressed, provision is made of a link 94 pivoted at its upper end to the forward end of the key-lever 18 corresponding to the key 59, and connected at its other end with the forwardly-extending arm 86 of the bell-crank lever 87 by means of a headed screw 95 passing through a slot 96 in the lower end of the link 94, and threaded into the arm 86 at a point intermediate the pin 85 and the pivot 88. It will be seen by reference to Figure 1 that the slot 96 is of such length that, upon depression of the special "05" key 58, the screw 95 will merely be shifted to the lower end of the slot 96 and will produce no result on the special "10" key 59. Upon depression of the special "10" key 59, the bell-crank lever will be shifted first to the position to actuate the arm 91 and consequently advance the dial of lowest denomination one step. Upon completing the depression of the key 59, the toggle will be bent to the front, and the oscillating arm 91 will be drawn down to its normal position, and, upon the return of the key 59 to its normal position and the consequent return of the bell-crank 87, the arm 91 will be actuated again as the parts assume middle position, and then arm 91 will be restored to its normal position with the other parts in the position shown in Figure 1.

To support the register 84, provision is made of a bracket 97 having a register-supporting shelf 98 extending outwardly over a downwardly-inclined member 99 forming part of the keyboard-extension 100, the shelf lying close to the front of the main frame 15. The bracket also comprises a downwardly-extending portion or flange (not shown), which is secured to the side of the keyboard-extension. To support the bell-crank 87, its pivot 88, which is in the form of a screw, is threaded into a boss (not shown) formed on a bracket 102, which comprises a substantially vertical portion 103 and a horizontal portion 104, which engages the lower side of the main frame.

The present device is in the nature of an improvement on the invention disclosed in the co-pending application of Henry L. Pitman, Serial No. 621,520, filed February 27, 1923, (now Patent No. 1,580,326, dated April 13, 1926).

Variations may be resorted to within the scope of the invention, and portions of the improvements may be used without others.

Having thus described my invention, I claim:

1. In a typewriting machine for writing bills comprising a series of columns, ordinary character-keys and a special character-key, a carriage, carriage-propelling means, escapement mechanism controlling the movement of the carriage, comprising a rack on the carriage, having teeth pitched at single letter-space distance apart therealong with toothless gaps of predetermined extent separated by a single tooth, a pinion in mesh with the rack, means co-operative with the gap for permitting a single letter-space movement of the pinion to initiate a column jump as an incident to the operation of an ordinary character-key, and means for determining a multiple letter-space movement of the pinion, and co-operating with another gap and the single tooth, to free the carriage and initiate a second column jump of the carriage, as an incident to the operation of the aforementioned special character-key.

2. In a typewriting machine for writing bills comprising a series of columns, an intermediate column of which includes items written by a single key-stroke, ordinary character-keys and a special character-key, a carriage, carriage-propelling means, escapement mechanism controlling the movement of the carriage, comprising a rack on the carriage, having teeth pitched at single letter-space distance therealong, a pinion having two teeth in mesh with the rack, the rack having a gap to permit the carriage to jump automatically to the intermediate column upon completion of writing in the preceding column, a tooth on the rack for arresting the carriage in the intermediate column and being followed by a second gap, means for determining a single letter-space movement of the pinion as an incident to the operation of each ordinary character-key, and means for determining a multiple letter-space movement of the pinion to clear from said arresting tooth on the rack both of said two intermeshing pinion-teeth, as an incident to the operation of the special character-key.

3. In a typewriting machine, a carriage, carriage-propelling means, escapement mechanism comprising a pinion having a normal, key-controlled, step-by-step movement, to control the letter-feeding movements of the carriage, a rack normally in mesh with the pinion and having a gap therein, and means for releasing the pinion to an abnormal rotary movement thereof, to permit the pinion to reach the gap in the rack and thus free the carriage for a jump thereof.

4. In a typewriting machine, a carriage, carriage-propelling means, a rack on the carriage having its teeth arranged at letter-space intervals, escapement mechanism comprising a pinion having its teeth at letter-space intervals, and arranged to be advanced a tooth-space at each operation, each tooth of the pinion having two rack-engaging positions, the rack having a plurality of gaps in its teeth of unequal extent, for causing the carriage to jump forward automatically, and means for effecting an abnormal throw of the pinion such that, at one of said gaps, the rack leaves engagement with one tooth of the pinion, and is arrested by engagement with the next pinion-tooth but one to the tooth last engaged, whereby the length of said jump is one tooth-space less than the number of teeth omitted from the rack.

5. In a typewriting machine for writing bills comprising a series of columns, a carriage, carriage-propelling means, escapement mechanism for the carriage a rack on the carriage, said rack having a gap in its toothed portion, a toothed wheel geared to the rack, a dog intermeshing with the teeth of the wheel, a stop for determining a single letter-space throw of the dog, and consequently of the wheel in mesh therewith, another stop for determining a multiple letter-space throw of the dog to permit a column jump of the carriage through said gap, and means for substituting the last-mentioned stop for the first-mentioned stop, in the path of the dog, as an incident to the operation of a character-key in completing the writing in one of the columns.

6. In a typewriting machine for writing bills comprising a series of columns, a carriage, carriage-propelling means, escapement mechanism for the carriage comprising a rack on the carriage, a toothed wheel geared to the rack, a dog intermeshing with the teeth of the wheel, a stop for determining a single letter-space throw of the dog, and consequently of the wheel in mesh therewith, another stop for determining a multiple letter-space throw of the dog to initiate a column jump of the carriage, and means for submitting the last-mentioned stop for the first-mentioned stop, in the path of the dog, as an incident to the operation of a character-key in completing the writing in one of the columns; the rack having a gap therein to allow for completion of the column jump thus initiated.

7. In a typewriting machine for writing bills comprising a series of columns, a carriage, carriage-propelling means, escapement mechanism for the carriage including a rack on the carriage having at least one gap in its toothed portion, a toothed wheel geared to the rack, a dog intermeshing with the teeth of the wheel, a stop for determining a single letter-space throw of the dog, and consequently of the wheel in mesh therewith, another stop for determining a multiple letter-space throw of the dog to permit a column jump of the carriage, a carrier for the stops, a plurality of keys, and connections for each of said keys for shifting the carrier to substitute the last-mentioned stop for the first-mentioned stop, in the path of the dog, to free the carriage and initiate a column jump of the carriage, as an incident to the operation of any one of said keys.

8. In a typewriting machine for writing bills comprising a series of columns, a carriage, a carriage-propelling means, escapement mechanism for the carriage including a rack on the carriage, said rack having a plurality of gaps in its toothed portion, a toothed wheel geared to the rack, a dog intermeshing with the teeth of the wheel, a stop for determining a single letter-space throw of the dog, and consequently of the wheel in mesh therewith, another stop for determining a multiple letter-space throw of the dog to permit a column jump of the carriage, a carrier for the stops, a plurality of keys and connections for each of said keys for shifting the carrier to substitute the last-mentioned stop for the first-mentioned stop, in the path of the dog, to free the carriage and initiate a column jump of the carriage through one of said gaps, as an incident to the operation of any one of said keys; said connections comprising a rockshaft with an arm thereon for engagement with the stop-carrier, and arms thereon attached to the levers of said keys.

9. In a typewriting machine for writing bills comprising a series of columns, a carriage, carriage-propelling means, escapement mechanism for the carriage including a rack on the carriage, said rack having a gap in its toothed portion, a toothed wheel geared to the rack, a dog intermeshing with the teeth of the wheel, a stop for determining a single letter-space throw of the dog, and consequently of the wheel in mesh therewith, another stop for determining a multiple letter-space throw of the dog to free the carriage and permit a column jump of the carriage through said gap, means for substituting the last-mentioned stop for the first-mentioned stop, in the path of the dog, as an incident to the operation of a character-key in completing the writing in one of the columns, and means for automatically returning the stops to original positon upon release of the said key.

10. In a typewriting machine for writing bills comprising a series of columns, a carriage, carriage-propelling means, ordinary type-keys, escapement mechanism for the carriage including a rack on the carriage, a toothed wheel geared to the rack, a dog intermeshing with the teeth of the wheel, a stop for determining a single letter-space throw of the dog, and consequently of the wheel in mesh therewith, another stop for determining a multiple letter-space throw of the dog to permit a column jump of the carriage, a non-ordinary key, a type-bar connected to said non-ordinary key, a connection from said non-ordinary key to the escapement mechanism, and connections from the non-ordinary key for substituting one of said stops for the other in the path of the dog, said rack having a gap affording movement of the carriage additional to that afforded by the substituted stop upon operation of said non-ordinary key.

11. In a typewriting machine, a carriage, carriage-propelling means, escapement mechanism for the carriage, comprising a rack on the carriage, a pinion meshing with the rack, a dog controlling the rotary movement of the pinion, the rack having a gap therein to provide for a column jump of the carriage upon entry of the pinion into said gap, a tooth on the rack defining the right-hand end of the gap, and another gap to the right of said tooth to provide for another column jump of the carriage after said tooth has passed the pinion, a stop for determining the throw of the dog for single letter-space movement of the carriage, a second stop for determining a multiple letter-space throw of the dog to permit the pinion to clear said tooth, and means for substituting the last-mentioned stop for the first-mentioned stop after the carriage has been arrested by said tooth.

12. In a typewriting machine, a carriage, carriage-propelling means, escapement mechanism for the carriage, comprising a rack on the carriage, a pinion meshing with the rack, a dog controlling the rotary movement of the pinion, the rack having a gap therein to provide for a column jump of the carriage upon entry of the pinion into said gap, a tooth on the rack defining the right-hand end of the gap, and another gap to the right of said tooth to provide for another column jump of the carriage after said tooth has passed the pinion, a stop for determining the throw of the dog for single letter-space movement of the carriage, a second stop for determining a multiple letter-space throw of the dog to permit the pinion to clear said tooth, a key, and means for substituting the last-mentioned stop for the first-mentioned stop as an incident to the operation of said key in the column position determined by said tooth.

13. In a typewriting machine, a carriage, carriage-propelling means, escapement mechanism for the carriage comprising a rack, mutilated to provide for column jumping of the carriage, a control device geared to the rack, means for determining a letter-space movement of the control device, and means for determining a greater movement of the control device to clear the same into a gap formed by the mutilation when column jumping is desired.

14. In a typewriting machine, a carriage, carriage-propelling means, escapement mechanism for the carriage comprising a rack, mutilated to provide for column jumping of the carriage, a control device geared to the rack, means for determining a letter-space movement of the control device, means for determining a greater movement of the control device to clear the same into a gap formed by the mutilation when column jumping is desired, character-keys, and means for effecting such greater throw of the control device as an incident to the operation of a character-key in completing the writing in one column.

15. In a typewriting machine, the combination of a propelled letter-feeding carriage, and carriage-escapement mechanism, said escapement mechanism comprising means to automatically jump the carriage from one column to another, said means comprising a mutilated feed-rack having a gap on its toothed edge, and an escapement dog having a variable throw.

16. In a typewriting machine, the combination of a propelled letter-feeding carriage, a platen on said carriage, special keys operating type-bars to print against said platen, carriage-escapement mechanism, said escapement mechanism comprising a feed-rack having a gap on its toothed edge, a pinion and a loose dog, and means actuable by said special keys to effect a greater throw of the loose dog, so that the resultant feed of the carriage frees the feed-rack from said pinion, so that the carriage may be moved an extent dependent upon the length of the gap in the feed-rack.

17. In a typewriting machine, the combination of a propelled letter-feeding carriage, carriage-escapement mechanism, said escapement mechanism comprising a feed-rack meshing with a pinion, said rack having two gaps on its toothed edge separated by a single tooth, the relation of said rack and said pinion being such that it requires two letter-space movements of the carriage for a rack-tooth to pass said pinion, the first gap being provided to jump the carriage from a first column to a second column, said single tooth engaging the pinion when the carriage is in the second column, and means to effect a greater feed of the pinion to allow said single tooth to pass the pinion, and consequently allow the carriage to jump to a third column a distance dependent upon the length of the gap.

18. In a typewriting machine, the combination of a propelled letter-feeding carriage, a platen on said carriage, special type-keys operating type-bars to print against said platen, carriage-escapement mechanism, said escapement mechanism comprising a feed-rack meshing with a pinion, said feed-rack having two gaps on its toothed edge separated by a single tooth, the relation of the rack and the pinion being such that it requires two letter-space movements of the carriage for a rack-tooth to pass said pinion, the first gap being provided to jump the carriage from a first column to a second column, said single tooth engaging the pinion when the carriage is in the second column, said escapement mechanism comprising also a loose dog, and means actuable by the special keys to effect a greater throw of said loose dog, and a consequent greater feed of the carriage, to allow said single tooth to pass the pinion, and consequently allow the carriage to jump to a third column a distance dependent upon the length of the gap.

19. In a typewriting machine, the combination of a propelled letter-feeding carriage, a feed-rack on said carriage, a pinion meshing with said rack, an escapement wheel driven by said pinion, a loose dog and a fixed dog co-operating with said escapement wheel, keys to operate said dogs to effect feeding movements of said carriage, the feed-rack having on its toothed edge two gaps separated by a single tooth, the relation of the pinion and the rack being such that it requires two letter-space movements of the carriage for a rack-tooth to pass said pinion, special keys operable when said single tooth engages the pinion, and means operable by said special keys to effect a double-space movement of the escapement wheel, to allow the single tooth to pass said pinion, and consequently set the carriage free to be moved until the tooth bordering the second gap comes in contact with said pinion.

20. In a typewriting machine, a carriage, writing keys, and mechanism to control the movement of the carriage arranged to automatically jump the carriage to a selected column as an incident of a writing operation and to automatically permit uninterrupted movement of the carriage from said column to a succeeding column as an incident of a single key operation, said mechanism including a mutilated carriage rack and a variable feed escapement.

21. In a typewriting machine including a propelled carriage, a feed-rack for said carriage and escapement mechanism, said feed-rack having a plurality of gaps to permit jumping of the carriage, an arresting member between two gaps, co-operative with the carriage-escapement mechanism to arrest the carriage, and means controlled by a single key operation in typing, to release said member from the escapement mechanism, said means including a variably-fed escapement pinion.

JOHN WALDHEIM.